March 26, 1940.            J. L. GETAZ            2,195,365
                      AUTOMOBILE TRANSMISSION
                        Filed Oct. 8, 1932         3 Sheets-Sheet 3
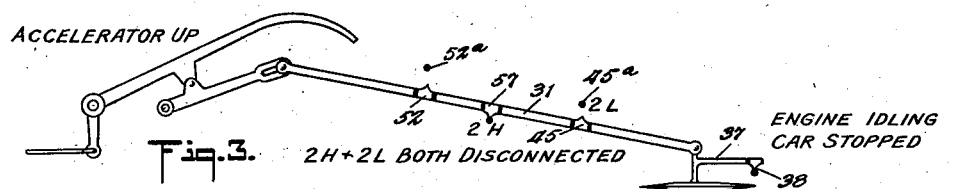
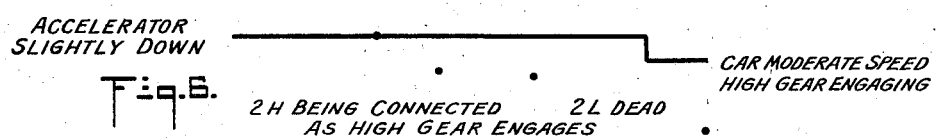
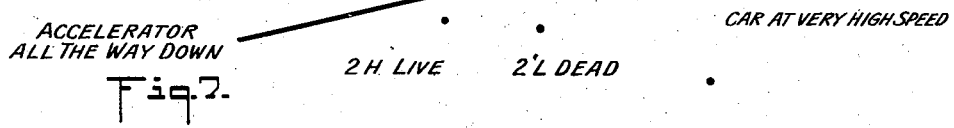
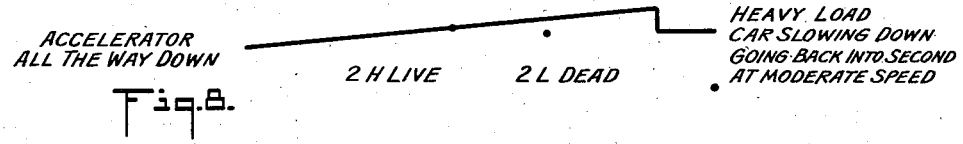
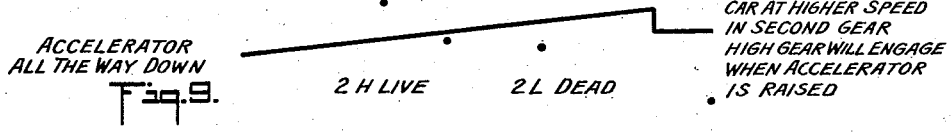
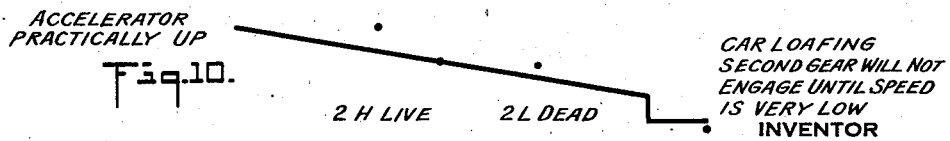
INVENTOR
JAMES L. GETAZ
BY HIS ATTORNEYS Patented Mar. 26, 1940

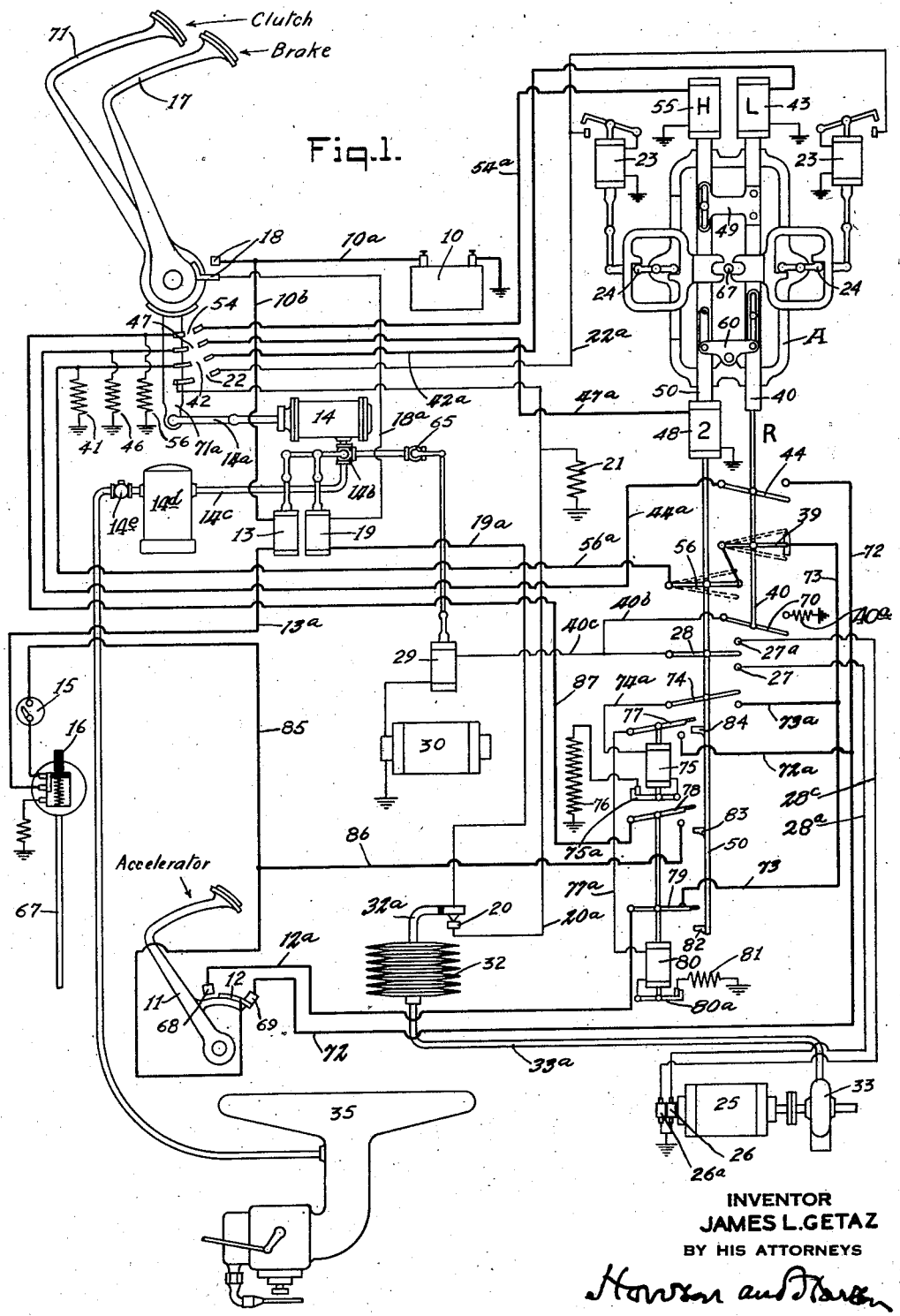

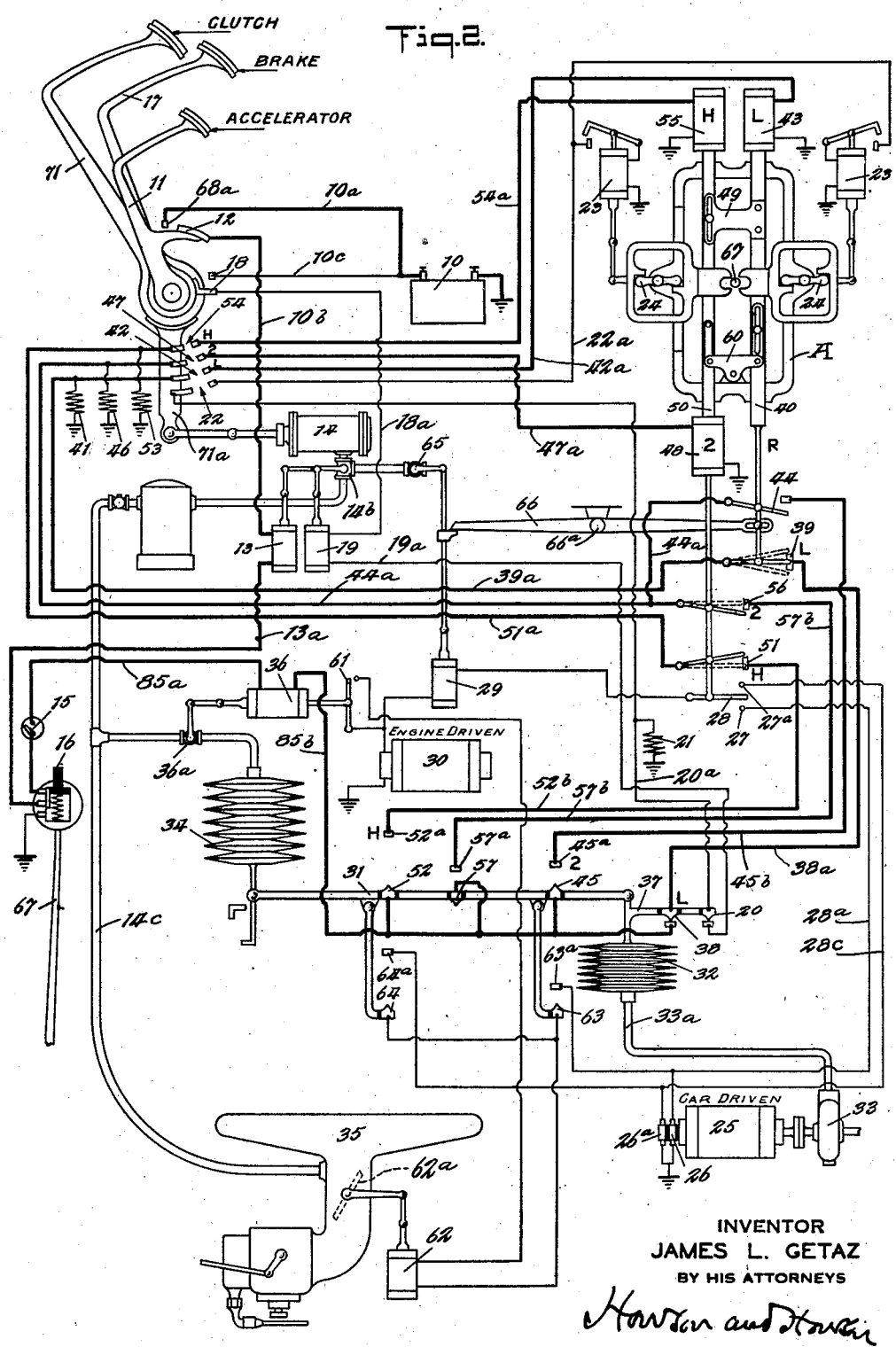

2,195,365

UNITED STATES PATENT OFFICE 2,195,365

AUTOMOBILE TRANSMISSION

James L. Getaz, Maryville, Tenn.

Application October 8, 1932, Serial No. 636,907

41 Claims. (Cl. 192—.01)

This invention relates to means for shifting gears of an automobile and more particularly to a power operated means for such purpose and its controlling means and it is an object of this invention to provide means controlled by the operator's manipulation of the accelerator pedal for shifting the gears through the various positions from neutral position to high gear and for returning the gears to neutral position upon the stopping of the car by the application of the brake. It is also an object of this invention to provide a means whereby the position of the gears determines the possible succeeding operation of the gears. It is also an object of this invention to provide a means for operating the clutch to permit of readily shifting the gears and to provide means for engaging the clutch at a rate dependent upon the relative speeds of the car and the engine and upon the gear position at the time. It is also an object of this invention to provide means for adjusting the engine speed to correct the speed for clutch engagement upon the shifting of the gears.

In the drawings—

Figure 1 is a diagrammatic view illustrating one embodiment of this invention;

Figure 2 is a diagrammatic view illustrating a modification of the apparatus shown in Fig. 1; and Figures 3 to 10 inclusive are fragmentary diagrammatic views illustrating various operative positions of a further modification.

As shown in Figure 1, in addition to the usual gear set A, brake pedal 17, clutch pedal 71 and accelerator pedal 11, there is provided a vacuum cylinder 14 having a piston or diaphragm therein connected by link 14a to an extension 71a of the clutch operating pedal 71. The vacuum cylinder 14 is connected through valve 14b and pipe 14c to the intake manifold 35 of the engine. A container 14d is provided to enlarge the capacity of the pipe 14c which is kept at reduced pressure and thus accelerate the operation of the vacuum cylinder 14 while a check valve 14e prevents the flow of gas from the manifold 35 to the container 14d and tends to maintain the container at the reduced pressure when the engine is stopped. Valve 14b controls the connection of the cylinder 14 to the intake manifold 35 and is operated by either one of solenoids 13 and 19. Admission of air to the cylinder 14 is controlled by means of a valve 65 operated by means of a solenoid 29. To operate the gear set A to the low, intermediate and high gear positions, there are provided the solenoids 43, 48 and 55 respectively which are connected to the rods 40 and 50 of the gear set. Operated by movement of the rods 40 and 50 are switches 44, 39 and 70 operated by the rod 40 and switches 56, 28 and 74 operated by the rod 50 while switches 77 and 78 which are closed by solenoids 75 and 80 respectively are opened by the rod 50 and switch 79 which is opened by the solenoid 80 is closed by the rod 50. There is also provided a generator 30 driven by the engine and generating a voltage proportional to the speed of the engine which is connected to the solenoid 29 and through switches 28 and 70 to the ground or to one of the commutators 26 and 26a of a generator 25 driven by the car and whose voltage is arranged to oppose the voltage generated by the generator 30. The commutators of the generator 25 are connected to armature windings of different numbers of coils, the number of coils being such that the voltages generated thereby are of the same proportion as the gear ratios and the switch 28 is operated so as to oppose the voltage of the proper commutator of generator 25 to the voltage of the generator 30. Driven from the same shaft as the generator 25 is a pump or impeller 33 connected through pipe 33a to the expansible chamber or diaphragm 32 which controls, through arm 32a, a switch 20.

The gear set A is provided with the usual shift lever 67 and in the usual knob thereof is provided a switch, as 16, arranged in circuits controlling the gear set. The gear set is also provided with rack and pinions 24 which are operated by movement of the rods 40 and 50 of the gear set so that upon operation of the gear set to mesh any of the gears thereof a rack and pinion 24 is operated to close the contact in the circuit of the associated solenoid 23. The rods 40 and 50 are also provided with pin and slot connections 49 and 60 so arranged that the movement of either the rods 40 and 50 to place one set of gears in mesh will operate the other of the rods 40 and 50 to place the gears operated by said other rod in neutral position. There are also provided the switch 18 which is operated by the brake pedal 17 and switches 22, 42, 47 and 54 which are operated by the clutch pedal extension 71a and which are closed when the clutch pedal is moved to disengage the clutch. There is also provided a contact 12 operated with the accelerator pedal 11 and which, when the accelerator pedal is raised, engages with a contact 69 and which, when the accelerator pedal is pressed downward to open the throttle valve in the usual manner, engages with a contact 68. The various switches and solenoids are connected in circuits to control the supply of current to the various solenoids for operation thereof from the battery 10, which may be the usual storage battery now used in automobiles.

With the gear set in the neutral position and the clutch, brake and accelerator pedals raised as with the car at rest, the switches operated by the clutch and brake pedals will be open as shown in Fig. 1, while the contact 12, operated by the accelerator pedal, will be in engagement with the contact 69; switch 16 in the knob of the gear shift lever 67 will be raised as shown and if desired that the system should be operated, the switch 15 which is placed in a conveniently accessible position, as on the dash board, will be closed. With the gear set in neutral position, the switches 44 and 70 operated by the rod 40 are opened while the switch 39 is closed and the switches 56 and 79 operated by the rod 50 are closed while the switches 28, 74, 77 and 78 are open, all as shown in Figure 1. With the engine in operation, in order to start the car the operator depresses the accelerator pedal engaging contact 12 with contact 68 and completing the circuit from the battery 10 through leads 10a and 10b to the solenoid 13, through lead 13a to the switch 16, through switch 15 and lead 85 to the contacts 12 and 68, through lead 12a to switch 79 and lead 73 to switches 39 and 56, lead 56a to the ground through resistance 41, thus energizing the solenoid 13 and operating the valve 14b to connect the vacuum cylinder 14 to the intake manifold 35. Operation of the diaphragm or piston of cylinder 14 operates the clutch pedal 71 to disengage the clutch and operates extension 71a thereof to close the switches operated thereby, thus completing a circuit through the switch 42, lead 42a and the solenoid 43 to ground in parallel with the resistance 41, energizing the solenoid 43 and operating the rod 40 to place the low gear of the gear set A in mesh. Operation of the rod 40 operates switch 39 interrupting the circuit of the solenoids 13 and 43 and permitting the valve 14b to be restored to its normal position and to admit air to the vacuum cylinder 14 permitting the clutch pedal 71 to return to its normal position and to engage the clutch. Operation of the rod 40 also operates switch 70 establishing connection from generator 30, solenoid 29, leads 40c and 40b through resistance 40a to the ground. Generator 30 will energize solenoid 29 and operate valve 65 to restrict the passage of air to the vacuum cylinder 14 thus delaying the engagement of the clutch. Operation of the rod 40 also operates the associated rack and pinion 24 closing the switch of the associated solenoid 23.

Movement of the rod 40 to engage the low gear operates switch 44 to close the same thus establishing circuits for the operation of the gear set to the second or intermediate position. With the gear set in first or low position, when the operator desires to change to second or intermediate position he permits the accelerator 11 to raise until the contact 12 engages with the contact 69, whereupon a circuit is established from the battery 10 through solenoid 13 and the leads and switches above described to contacts 12 and 69, lead 72, switch 44 and lead 44a to the ground through resistance 46 energizing the solenoid 13 and causing the clutch pedal 71 to be operated as previously described, disengaging the clutch and closing the switches operated by the extension 71a. With the switches closed by the extension 71a, a circuit is completed through switch 47, lead 47a and solenoid 48 to the ground in parallel with the resistance 46, thus energizing the solenoid 48 and operating rod 50 to shift the gear set to the second or intermediate position. Movement of the rod 50 through pin and slot connection 49 shifts the rod 40 to the neutral position disengaging the first gear. Movement of the rod 50 through its rack and pinion 24 closes the contact of the solenoid 23 associated therewith. The movement of the rod 50 also opens the switch 56 interrupting the circuit of the solenoids 13 and 48 and closes the switches 28 and 74. Rod 40, when it is shifted to neutral position by the rod 50, opens the switches 44 and 70 and closes switch 39. Switch 28 when engaged with the contact 27 completes a circuit from commutator 26 through lead 28a and 40c to the solenoid 29 so that the voltages of the commutator 26 and generator 30 are opposed controlling the operation of the valve 65 to regulate the return of the clutch to engagement in accordance with the variation of the speed of the engine from the proper speed for engagement of the clutch.

The windings of the generators 25, 30 are such that if the speed of the engine is proper for engagement of the clutch at the speed of the car, the opposing voltages will be alike and no current will pass through solenoid 29 and the valve 65 will remain open permitting free access of air to the vacuum cylinder 14 and a rapid engagement of the clutch, but if the speed of the engine is not correct in proportion to the speed of the car for the engagement of the clutch, the opposing voltages will not be identical and current will pass through the solenoid 29 operating the valve 65 to partially close the valve and restrict the flow of air to the cylinder 14, thus delaying the engagement of the clutch and preventing objectionable jar thereby.

To supply power to the car the operator then depresses the accelerator pedal to open the throttle valve and this movement of the accelerator pedal 11 engages contact 12 with contact 68 completing the circuit from the battery 10 through solenoid 13 and the leads and switches above described to contacts 12 and 68, lead 12a, switch 79 and lead 73, lead 73a, switch 74, lead 74a, solenoid 75 and to ground through the resistance 76. The energizing of the solenoid 75 operates switch 77 to closed position and at the same time opens the switch 75a to interrupt the circuit through the solenoid 75. The time and current necessary for the operation of solenoid 75 are insufficient to cause the operation of solenoid 13 so that the clutch is not operated at this time.

With the gear set in second position the operator, to change the gear set to the high or third position, permits the accelerator pedal 11 to raise, engaging contact 12 with contact 69 thereby completing the circuit from battery 10 through solenoid 13 and the leads and switches above described to contacts 12 and 69, leads 72 and 72a, switch 77, lead 77a and solenoid 80 to the ground through resistance 81 operating solenoid 80 to close switch 78 and open switches 79 and 80a, thus interrupting the circuit of the solenoid 80. Closing of the switch 78 establishes a circuit from the battery 10 through solenoid 13 and the leads and switches above described to lead 85, lead 86, switch 78 and lead 87 to the ground through resistance 56 thus energizing the solenoid 13 and operating the clutch pedal 71 to disengage the clutch and to close the switches operated by the extension 71a. Closing of the switches operated by the extension 71a completes a circuit through the switch 54, lead 54a and solenoid 55 to ground in parallel with the resistance 56, thus energizing solenoid 55 and shifting the rod 50 to operate the gear set to the high or third position.

Operating the gear set to the high or third position shifts the gear set from the second or intermediate position and at the same time shifts the switch 56 through the closed position to an open position, operates switch 28 to engage with the contact 27a, opens switch 74 and engages lugs 84 and 83 with switches 77 and 78 respectively to open these switches and engages lug 82 with switch 79 to close this switch. Switch 56, however, passes through the closed position before switch 79 is closed so the circuit is not completed by this operation. Closing of the switch 28 with the contact 27a establishes a circuit from the commutator 26a through lead 28c, switch 28 and lead 40c to the solenoid 29 where the voltage from commutator 26a is opposed by the voltage of the generator 30 operating solenoid 29 to regulate the valve 65 to control the return of the clutch to engaging position as the solenoid 13 is deenergized by the opening of the switch 78 by the lug 83.

With the car in motion, irrespective of which gear has been engaged, the pump 33 expands the collapsible chamber 32 and opens the switch 20, the arrangement being such that the switch 20 will be closed upon the reduction of the car speed to a predetermined value. With the car in motion should the operator desire to stop the car, he depresses the brake pedal 17 applying the brakes to the car and gradually decreasing the speed of the car until the switch 20 closes. Operation of the brake pedal 17 closes switch 18 completing a circuit when switch 20 closes from the battery 10 through switch 18, lead 18a, solenoid 19, lead 19a, switch 20, lead 20a and resistance 21 to the ground thereby energizing the solenoid 19 and operating the valve 14b to disengage the clutch as when the solenoid 13 is energized. Operation of the clutch causes the switch 22 to be closed by the extension 71a completing a circuit in parallel with the resistance 21 through lead 22a to whichever of the solenoids 23 at that time has its contacts closed, energizing the solenoid or solenoids 23 and operating the rack and pinion 24 to return the rod 40 or 50, or both, to the neutral position, thus restoring all the switches to the positions shown in Fig. 10.

Should it be desired to shift the gears manually, the operator by grasping the knob of the gear shift lever 67 and depressing the switch 16 will complete a circuit from the battery 10 through leads 10a, 10b, solenoid 13, lead 13a and switch 16 to the ground, thus energizing the solenoid 13 and operating the clutch lever 71 to disengage the clutch. The gear shift lever 67 is then operated to shift the gears to the desired position and the gear shift lever released, whereupon the switch 16 is returned to its raised position, interrupting the circuit through the solenoid 13, de-energizing the solenoid 13 and permitting the clutch to be returned to engagement. The operation of the rods 40 and 50 by the gear shift lever, however, establishes the proper circuits between the generators 25 and 30 so that the solenoid 29 is operated to control the return of the clutch to engagement, thus providing for the mechanical operation of the clutch and the control of the clutch during engagement in connection with the manual operation of the gears. Further, when it is desired that the entire operation of clutch and gears be performed by the operator, the switch 15 is left open preventing energizing of any of the solenoids.

In the modification shown in Fig. 2, the gear set A is provided with solenoids 43, 48 and 55 operating the rods 40 and 50 and with the racks and pinions 24 connected to the solenoids 23 as in the prior construction. The rod 40, however, is arranged to operate switches 44 and 39 while rod 50 is arranged to operate switches 56, 51 and 28. The usual gear shift lever 67 having a switch 16 in the knob thereof is provided. The usual clutch lever 71, brake lever 17 and accelerator pedal 11 are provided, the clutch pedal being provided with an extension 71a which operates switches 22, 42, 47 and 54 as in the previous construction. The clutch pedal is operated by a vacuum cylinder 14 which is controlled by valves 14b and 65 and the valve 14b is controlled by the solenoids 13 and 19 as in the previous construction, while the valve 65 is operated by a solenoid 29 governed by opposed voltages from the generators 25 and 30 as in the other construction. In addition there is also provided a lever 66 pivoted at 66a and operated by the rod 40 to govern the operation of the valve 65 when the gears are placed in low or first position and there is also provided a contact bar 31 pivotally and movably supported at its ends by collapsible diaphragms or chambers 32 and 34, the collapsible chamber 32 being expanded by pressure from the pump 33 through pipe 33a as in the other construction, while the collapsible chamber 34 is connected to the pipe 14c leading to the engine intake manifold 35. This arrangement provides a contact bar, the position of which depends upon the speed of the car which operates the pump 33 and by the work done by the engine as evidenced by the degree of vacuum in the intake manifold to which the collapsible chamber 34 is connected. At intervals along the bar 31 are placed contacts which cooperate with suitably positioned fixed contacts in completing circuits for the control of the gear shift mechanism and the speed of the engine. There is also provided a contact bar 37, the position of which depends entirely upon the degree of expansion of the collapsible chamber 32 and the bar 37 is also provided with a plurality of contacts cooperating with fixed contacts in the control of the gear shift and the return of the clutch to engagement.

The modification shown in Figures 3 to 10 provides for a mechanical connection between the bar 31 and the accelerator pedal 11. In the construction shown in Figure 2, the end of the bar 31 which is operated by the collapsible diaphragm 34 will have its position depend more or less closely on the position of the accelerator, that is, the work being done by the engine will be dependent more or less upon the position of the accelerator so that the operation of the bar 31 in Figure 2 and Figures 3 to 10 is substantially the same. The bar 37, which depends entirely upon the expansion of the collapsible chamber 32, is also shown in Figures 3 to 10. In Figures 3 to 10 the remainder of the circuits may be as shown in Figure 2 but they are omitted from these figures for the sake of clearness.

With the gear set in the neutral position and the accelerator, brake and clutch pedals raised, the switch 15 is closed and the switch 16 released so that it may raise to the upper position as shown. In order to start the car the operator will depress the accelerator pedal 11 bringing contact 12 operated thereby into engagement with a contact 68a and establishing a circuit from the battery 10 through lead 10a, contacts 68a and 12, lead 10b, solenoid 13, lead 13a, switches 16 and 15, lead 85a, solenoid 36 and lead 85b to the contacts on the bars 31 and 37. With the car at rest the pump 33 will not be operating and the collapsible chamber 32 will assume a position in which the contacts at 38 on the bar 37 will be engaged, completing the circuit from the lead 85b through lead 38a, switch 39 and lead 39a to the ground through resistance 41 energizing the solenoid 13 and causing the operation of the clutch pedal 71 to disengage the clutch and to close the switches 22, 42, 47 and 54 as in the other construction. With the clutch disengaged and the switches closed the circuit is completed through switch 42, lead 42a and the solenoid 43 to the ground in parallel with the resistance 42, energizing solenoid 43 and operating the rod 40 to shift the gears to the low or first position. Movement of the rod 40 operates the switches 39 and 44 opening switch 39 and closing the switch 44. It also operates the rod 66 to shift the valve 65 to a partly closed position so that upon the de-energization of the solenoid 13 upon the opening of the switch 39, the return of the clutch to engaging position is delayed causing the clutch to engage at such a rate that the jar will not be objectionable.

As in the other modification, movement of the rod 40 to engage the low gear of the gear set A operates the rack and pinion 24 to close the contact for the solenoid 23 associated therewith. With the engine in motion the position of one end of the bar 31 will be dependent upon the degree to which the collapsible chamber 34 is collapsed by the vacuum in the intake manifold and in order to prevent any change in the position of this end of the bar during the operation of the gear set the solenoid 36 is provided. Solenoid 36 is placed in the circuit with the solenoid 13 and energized at the same time so that each time the solenoid 13 is energized to operate the clutch, the solenoid 36 is energized and operates valve 36a to close the connection between the collapsible chamber 34 and the pipe 14c leading to the intake manifold 35 thus maintaining the degree of vacuum in the collapsible chamber 34 constant during the operation of the gear set A and preventing any undesired changes in the position of the bar 31. The solenoid 36 is also arranged to operate a switch 61, the purpose of which will be hereinafter set forth, at the same time that the valve 36a is operated.

As the clutch is engaged by the movement of the clutch pedal 71, and the car is placed in motion, the pump 33 is started and chamber 32 is expanded as the speed of the car increases. Expansion of the chamber 32 raises the other end of the bar 31 and raises the bar 37 interrupting the circuit at the contacts 38 and also opening a circuit at contacts 20 on the bar 37. As the speed of the car increases the end of the bar 31 controlled by the expansion chamber 32 is raised but the position of the contacts on the bar 31, however, is in some measure dependent upon the degree of vacuum in the intake manifold 35 and the resultant contraction of the collapsible chamber 34. Under light load where the degree of vacuum in the chamber 34 is high the end of the rod 31 will be lifted to some extent so that as great an increase in the speed of the car to engage the contacts 45, 45a would not be required as where the degree of vacuum is low. Contacts 45, 45a when engaged complete a circuit from the battery 10 through the solenoids 13 and 36 and the leads and switches previously described to contacts 45, 45a, lead 45b, switch 44, which is closed while the rod 40 is in position with the low gears in mesh, lead 44a to the ground through resistance 46, energizing the solenoids 13 and 36 and causing the operation of the clutch pedal 71 and valve 36a, disengaging the clutch and closing the switches operated by the extension 71a and disconnecting the collapsible chamber 34 from the suction of the intake manifold 35. With the switches closed by the extension 71a, the circuit is extended through switch 47, lead 47a and solenoid 48 to the ground in parallel with resistance 46, thus energizing solenoid 48 which operates rod 50 to shift the gears to the second or intermediate position. As in the other construction, operation of the rod 50 through the pin and slot connection 49 returns the rod 40 to the neutral position and opens switch 44 and closes switch 39. Movement of the rod 50 to the position engaging the intermediate gears, closes switch 51 and engages switch 28 with the contact 27. Opening the switch 44 interrupts the circuit of the solenoids 13 and 36 and permits the clutch to be re-engaged and the valve 36a to be opened. The return of the clutch to the engaging position is, however, governed by the energization of solenoid 29 which is dependent upon the relative speeds of the engine and car as evidenced by the opposed voltages of the generator 30 driven by the engine and generator 25 driven by the car. The circuit for the solenoid 29 is completed from the generator 30 through the solenoid 29 by the switch 28 engaging the contact 27 which is connected by lead 28a with commutator 26 of generator 25. As in the other construction the commutators 26 and 26a are connected to armature windings having sufficient coils to give voltages which bear the same relation as the gear ratios, thus giving voltages which are in accord with the voltage of generator 30 when the engine is running at the proper speed for clutch engagement at each gear ratio. With the intermediate or second gear in mesh the switches 39 and 51 are closed and the circuits are established so that the gear set may be operated to place the gear set in the low or first position in case the speed of the vehicle falls sufficiently to cause the chamber 32 to collapse until the contacts at 38 engage. In case, however, the speed of the car and the vacuum in intake manifold 35 continue to increase, the chamber 32 will continue to expand and the chamber 34 will continue to collapse and the bar 31 will be raised until contact 52 engages with the fixed contact 52a completing the circuit from the battery 10 through the solenoids 13 and 36 and the leads and switches previously described to the contacts 52, 52a, lead 52b, switch 51, lead 51a to the ground through resistance 53, thus energizing the solenoids 13 and 36 causing the operation of the clutch pedal 71 and valve 36a. With the clutch pedal operated the clutch is disengaged and the switch 54 is closed by the extension 71a completing the circuit through lead 54a and solenoid 55 to the ground in parallel with the resistance 53, energizing the solenoid 55 and shifting the gear set to the high gear position. The movement of the rod 50 by the solenoid 55 to the high gear position causes the rod 50 to operate the switch 56 to closed position and to open switch 51 and to engage switch 28 with the contact 27a. Opening of the switch 51 interrupts the circuit of the solenoids 13 and 36 and causes the clutch to be re-engaged, the movement of the clutch in re-engagement being controlled by the valve 65 as in the other construction. The valve 65 at this time is operated by the solenoid 39 which is energized by current resulting from the opposed voltages of the generator 30 and the generator 25 which are connected through the switch 28, the contact 27a and lead 28c to a commutator 26a.

With the gear set in the high or third position the switch 56 is closed so that if the load upon the engine becomes sufficient to require a throttle opening which reduces the vacuum in the intake manifold permitting the chamber 34 to expand and the speed of the car drops causing the chamber 32 to collapse until the bar 31 assumes the position in which the contact 57 engages the fixed contact 57a, a circuit is established from the battery 10 through solenoids 13 and 36 and the leads and switches previously described to contacts 57, 57a, lead 57b, switch 56 and lead 44a to the ground through resistance 46, energizing the solenoid 13 and operating the clutch pedal 71 to disengage the clutch and to close the switch 47. Closing the switch 47 completes a circuit through lead 47a and solenoid 48 to the ground in parallel with the resistance 46 energizing the solenoid 48 and shifting the gear set from high or third position to the second or intermediate position and at the same time operating the rod 50 to open the switch 56 and close switch 51 and engage switch 28 with the contact 27. Opening of the switch 56 interrupts the circuit of the solenoid 13 permittting the clutch to be re-engaged, the re-engagement of the clutch, however, being controlled as hereinbefore described by means of the solenoid 29 operating the valve 65. The closing of the switch 51 by the rod 50 and the closing of the switch 39 by the movement of the rod 40 to neutral position establishes circuits so that either solenoid 43 which operates the gear set to low gear position or the solenoid 55 which shifts the gear set to the high gear position may be energized by the movement of th bar 31 to engage the proper contacts.

In order to regulate the speed of the engine so that it may be more nearly at the proper speed for the engagement of the clutch each time the gears are shifted, a butterfly valve 62a in the intake pipe is provided. The butterfly valve is operated by a solenoid 62 controlled by the opposed voltages of the generators 25 and 30 in the same manner as is the solenoid 29. In order to provide for the control of the circuits of solenoid 62, contacts 63, 63a governed by the bar 31 are arranged to be engaged when the contacts 45, 45a are engaged and contacts 64, 64a are arranged to be engaged when the contacts 52, 52a are engaged. There is also provided the switch 61 operated by the solenoid 36 which is closed when the valve 36a is operated so that at each operation of the solenoids 13, 36, the switch 61 is closed to establish a circuit in case contacts 45, 45a or 64, 64a are engaged. In this modification as in the other, the gear set may be operated manually by depressing the switch 16 in the handle of the gear shift lever 67 to cause the operation of the clutch and the re-engagement of the clutch will be governed by the generators 25 and 30 as in the other modification. When the gear set is moved to the first or low position, the rod 66 will be operated to partially close the valve 65 in order to limit the movement of the clutch in engagement.

Operation of the brake pedal 17 will cause the contacts 18 to engage, completing a circuit from the battery 10 through lead 10c, contacts 18, lead 18a, solenoid 19, lead 19a, contacts 20 which engage when the car speed is reduced to the proper rate, lead 20a and resistance 21 to ground, energizing solenoid 19 to disengage the clutch and close switch 22. Closing switch 22 completes a circuit through switch 22, lead 22a and solenoids 23 to ground, energizing the solenoids 23 and operating rack and pinions 24 to restore either rod 40 or 50 to neutral position. Movement of the rack and pinion 24 to restore the associated rod to neutral position operates the associated switch 23a to open position and breaks the circuit for the solenoids 19 and 23 permitting the clutch to re-engage. The gear set is now in neutral position and the switches 38 and 39 are closed ready for the establishing of circuits to operate the gear set to first position.

In Figures 3 to 10 the controller bar 31 is shown arranged to be operated at the left end by being connected directly to the accelerator instead of being connected to a diaphragm which is operated by the vacuum in the intake.

In these figures are shown eight positions of the controller bar representing different conditions of driving the car. In Fig. 3 are shown the conditions which prevail when the engine is idling and the car is standing still. In this position both gear rods 40 and 50 are in neutral and contacts 45, 45a, 57, 57a and 52, 52a are disconnected by the switches 51, 56 and 44. The contacts at 38 are closed as is switch 39 so that the car is ready to shift into low gear as soon as the accelerator pedal 11 is pressed down. The gear set cannot shift into any other gear even though the controller bar might make contact at this time as all other circuits are broken at other points.

In Figure 4 the conditions shown are for the car running slowly in low gear with the acelerator pressed slightly down. In this position switch 44 is closed and contacts 45, 45a may be considered as "live" because the current will flow as soon as these contacts are closed, but the circuits of the other contacts 57, 57a and 52, 52a are kept open by the switches 51 and 56. As soon as the car attains sufficient speed the gear set will be shifted into second gear by the closing of contacts 45, 45a as shown in Figure 5. In second gear switch 51 is closed and the switches 56 and 44 are open and if the car attains sufficient speed in proportion to the position of the accelerator the bar 31 will be positioned to engage the contacts for high gear as shown in Figure 6.

As the speed increases, the right end of the controller bar 31 is raised still higher so that there is no possibility of engaging any second gear even though the accelerator is pressed all the way down as shown in Figure 7. But if, with the accelerator pressed all the way down, the speed falls below a predetermined rate, the contacts 57, 57a will close and the car will shift into second gear as shown in Figure 8. With the car in second gear, as the speed increases it will continue to operate in second gear until the increase in speed and the raising of the accelerator closes the contacts 52, 52a when it will again go into high gear. With the car running in high gear on a very light load and with the accelerator almost up it requires a very low speed to bring the right end of the controller bar 31 down to a point where the contact 57, 57a would meet and cause the gears to be shifted into second gear.

It is thus seen that with the accelerator up the car will not shift into second until the speed becomes very low as shown in Fig. 10, but with the accelerator all the way down, the car will shift into second at a considerably higher speed. The position of these contacts normal to the controller bar 31 and also their position along the line of the controller bar 31 may be so adjusted as to obtain the shifting of the gears under such conditions as may be desired.

In driving the car backward it is necessary for the operator to use the gear shift lever and for putting the car in reverse the clutch could be operated automatically by pressing the button 16 in the head of the gear shift lever. With the car running in reverse, as soon as it is brought to stop with the foot brake, the gear shift rod 40 will be shifted into neutral automatically, as mentioned above, and be ready to be shifted into low gear when the accelerator is pressed down.

I claim:

1. In an automobile, a gear set, an accelerator pedal, means for operating said gear set to establish different gear ratios controlled by said accelerator pedal and means operated by said gear set in moving to a gear ratio position for determining the gear ratio established by a subsequent operation of said gear set.

2. In an automobile, a gear set, an accelerator pedal, and electrical operating means for shifting said gear set to a plurality of gear ratio positions and an electric circuit controlling switch operated by said accelerator pedal for controlling said electrical operating means.

3. In an automobile, a gear set, an accelerator pedal, and electrical operating means for said gear set controlled by said accelerator pedal, said gear set in moving to one gear ratio position establishing circuits for a subsequent operation to another gear ratio position.

4. In an automobile, a gear set, an accelerator pedal and electrical operating means for said gear set controlled by said accelerator pedal, said gear set interrupting the completed circuits and establishing circuits for a subsequent operation thereof.

5. In an automobile, a gear set, an accelerator pedal and electrical operating means for said gear set controlled by said accelerator pedal, said gear set successively establishing circuits for its operation to successively increasing gear ratios upon each operation thereof until the maximum gear ratio is attained.

6. In an automobile, a gear set, an accelerator pedal, means for operating said gear set to establish different gear ratios controlled by said accelerator pedal, a brake pedal and means for operating said gear set to neutral position when establishing any one of said different gear ratios controlled by said brake pedal.

7. In an automobile, a gear set, an accelerator pedal, electrical operating means controlled by said accelerator pedal operating said gear set to establish different gear ratios, a brake pedal and electrical operating means controlled by said brake pedal for restoring the gear set to neutral position.

8. In an automobile, a gear set, an accelerator pedal and electrical operating means for said gear set controlled by said accelerator pedal, electrical operating means for returning said gear set to neutral position, a brake pedal and electrical contacts controlled by said brake pedal and gear set cooperating in the control of said second electrical operating means.

9. In an automobile, a gear set, an accelerator pedal and a brake pedal, electrical operating means for said gear set controlled by said accelerator pedal and means controlled by said brake pedal for restoring said gear set to neutral position.

10. In an automobile, a gear set, an accelerator pedal and a brake pedal, electrical operating means for said gear set controlled by said accelerator pedal, means controlled jointly by said brake pedal and means responsive to the speed of the vehicle for restoring said gear set to neutral position.

11. In an automobile, a gear set, throttle valve control means and braking control means, operating means for said gear set controlled by said throttle valve control means and means controlled by said braking control means for operating said gear set to neutral position.

12. In an automobile, a gear set, throttle valve control means and braking control means, operating means for said gear set controlled by said throttle valve control means and means responsive to the vehicle speed preventing operation of said gear set to neutral position by said braking control means while the vehicle speed exceeds a predetermined value.

13. In an automobile, a gear set, throttle valve, clutch and braking controlling means, means for operating the clutch controlled by said throttle valve controlling means, means for operating said gear set controlled by said clutch operating means and means controlled by said braking controlling means for operating said gear set to neutral position.

14. In an automobile, an accelerator pedal, a clutch operating pedal, a gear set, electrical means controlling the operation of said clutch operating means and gear set, means controlled by the operation of said accelerator pedal for controlling the operation of said clutch controlling means, means operated by said clutch operating pedal for controlling the operation of said gear set and means operated by said gear set for establishing control circuits for the subsequent operation of said gear set.

15. In an automobile, a gear set, speed and clutch controlling means, means for operating the clutch controlled by said speed controlling means, means for operating said gear set to establish different gear ratios controlled by said clutch operating means and means for regulating the operation of the clutch in accordance with the position of the gear set and the relative speeds of the motor and vehicle.

16. In an automobile, a gear set, speed and clutch controlling means, means for operating the clutch controlled by said speed controlling means, means for operating said gear set controlled by the operation of said clutch operating means and means regulating the engagement of the clutch parts in accordance with the relative speeds of the clutch parts.

17. In an automobile, a gear set, an accelerator pedal, a brake pedal, a clutch pedal, means controlled by said accelerator pedal for operating said clutch pedal, means controlled by said clutch pedal for operating said gear set, means operated by said gear set for determining the next operation of said gear set and means operated by said brake pedal for operating said gear set to neutral position.

18. In an automobile, a gear set, a plurality of rails for shifting said gear set to different gear ratios, means connecting said rails whereby movement of either rail to establish a gear ratio destroys a previously existing gear ratio and means operated by said rails for establishing connections for a succeeding operation of the gear set by said rails.

19. In an automobile, a gear set, a plurality of rails for shifting said gear set to different gear ratios, means connecting said rails whereby movement of either rail to an operative position returns to neutral position any other rail in an operative position and means operated by said rails for establishing connections for a succeeding operation of the gear set by said rails.

20. In an automobile, a gear set, means for operating said gear set to establish different gear ratios, means operated to shift said gear set from one gear ratio position upon movement of said gear set to another gear ratio position and means operated by said gear set for establishing connections for a succeeding operation of said gear set by said gear set operating means.

21. In an automobile, a gear set, means for operating said gear set to establish different gear ratios, means operated by said gear set in moving to a gear ratio position to shift said gear set from a previously established gear ratio position and means operated by said gear set for establishing connections for a succeeding operation of said gear set by said gear set operating means.

22. In an automobile, a gear set, rails for operating said gear set to different gear ratios, means for operating said rails, means for shifting a previously operated rail to neutral position upon the operation of a rail to a gear ratio position and means operated by said rails for establishing connections for a succeeding operation of the gear set by said rails.

23. In an automobile, a gear set, clutch operating means for operating said gear set to establish different gear ratios, a brake pedal and means controlled by said brake pedal for shifting said gear set from a gear ratio position.

24. In an automobile, a gear set having rails for operating said gear set to establish different gear ratios, clutch operating means for operating said rails, a brake pedal and means controlled by said brake pedal for shifting said rails from an established gear ratio position.

25. In an automobile, a gear set having operating rails therefor, a clutch operating means, means operated by said clutch operating means for operating said rails and speed controlling means controlling the operation of said clutch operating means.

26. In an automobile, a gear set having operating rails therefor, a clutch operating means, means operated by said clutch operating means for operating said rails and means operated by said rails for determining the next operation of said rails by said clutch operating means.

27. In an automobile, a gear set having operating rails therefor, a clutch operating means, means operated by said clutch operating means for operating said rails and means positioned by said rails in moving to one position for determining a position to which the rails can be moved by a subsequent operation of said clutch operating means.

28. In an automobile, a gear set having an operating rail therefor, projections operating with said rail, a lever operated in one direction by said projections upon movement of said rail in either direction from a neutral position and braking means controlling the operation of said lever to return said rail to the neutral position.

29. In an automobile, a gear set, means for controlling the speed of the vehicle and means for operating said gear set to establish different gear ratios, said speed controlling means having positions holding the gear set operating means inoperative when said gear set is in certain gear engagements and putting in motion said gear set when moved to other positions.

30. In an automobile, a gear set, means for operating said gear set to establish different gear ratios and means operated by said gear set in moving to a gear ratio position for determining the gear ratio established by a subsequent operation of said gear set.

31. In an automobile, a gear set, means for controlling the speed of the vehicle, means for operating said gear set to establish different gear ratios, said speed controlling means having positions holding the gear set operating means inoperative and putting in motion said gear set operating means and means for determining the position of the gear set after an operation thereof by its position before the operation thereof at all speeds of the vehicle.

32. In an automobile, a gear set, an accelerator pedal, means operating said gear set to different gear ratios controlled by said accelerator pedal, a brake pedal and means controlled by said brake pedal for restoring the gear set to neutral position.

33. In an automobile, a gear set, an accelerator pedal and a brake pedal, means for operating said gear set controlled by said accelerator pedal, and means controlled jointly by said brake pedal and means responsive to the speed of the vehicle for restoring said gear set to neutral position.

34. In an automobile, a gear set, a source of power for shifting said gear set, connecting means between said source of power and said gear set, manually controlled means controlling said connecting means to operate said gear set and means operative upon operation of said connecting means by said manually controlled means to hold said connecting means in position connecting said source of power and gear set until operation of said gear set is completed.

35. In an automobile, a gear set, a source of power for shifting said gear set, means for connecting said source of power and said gear set, manually controlled means to operate said connecting means for shifting from one forward speed to another and means operated by said gear set for interrupting said connecting means upon the completion of the shifting of said gear set by the power driven means.

36. In an automobile, a gear set, a source of power for shifting said gear set, clutch operating means, means for connecting said source of power and said gear set, means operated by the said clutch operating means for controlling said connecting means and means holding said connecting means connected by said clutch operating means until shifting of said gear set is completed.

37. In an automobile, a gear set, a source of power for shifting said gear set, clutch controlling means, connecting means between said source of power and said gear set, means operated by said clutch controlling means to operate said connecting means, and means automatically holding said clutch operating means in position to effect operation of said connecting means until shifting of said gear set is completed.

38. In an automobile, a gear set, a source of power for shifting said gear set, clutch operating means, means for connecting said source of power and said gear set, means operated by said clutch operating means to control said connecting means, and manually operated means cooperating with said clutch operating means to control said connecting means for shifting from one forward speed to another.

39. In an automobile, a gear set, a source of power for shifting said gear set, clutch operating means, manually operated means for controlling said clutch operating means in shifting from one forward speed to another, means for connecting said source of power and said gear set, means operated by said clutch operating means to control said connecting means, and means operated by said gear set to control said clutch operating means in the control of said connecting means upon the completion of the shifting of said gear set.

40. In an automobile, a gear set, a source of power for shifting said gear set, clutch operating means, manually operated means for controlling said clutch operating means in shifting from one forward speed to another, means for connecting said source of power and said gear set, means operated by said clutch operating means to control said connecting means, and means automatically holding said clutch operating means in position to maintain said source of power and said gear set connected until shifting of said gear set is completed.

41. In an automobile, a gear set, a source of power for shifting said gear set, clutch operating means, manually operated means for controlling said clutch operating means in shifting from one forward speed to another, means for connecting said source of power and said gear set, means operated by said clutch operating means to control said connecting means and means automatically disconnecting said source of power from said gear set upon the completion of the shifting of said gear set.

JAMES L. GETAZ.